US006359655B1

(12) United States Patent
Van Vignau et al.

(10) Patent No.: US 6,359,655 B1
(45) Date of Patent: Mar. 19, 2002

(54) CIRCUIT ARRANGEMENT FOR INDEX AND CONTROL FUNCTIONS OF A TELEVISION APPARATUS

(75) Inventors: Ralph Van Vignau; Jürgen Plog, both of Hamburg (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 08/838,489

(22) Filed: Apr. 7, 1997

(30) Foreign Application Priority Data

Apr. 17, 1996 (DE) .......................................... 196 15 086

(51) Int. Cl.[7] .......................... H04N 7/00; H04N 11/00
(52) U.S. Cl. ........................ 348/468; 348/461; 348/563; 348/567; 348/714
(58) Field of Search ................................ 348/468, 461, 348/478, 473, 563, 564, 569, 567, 488, 714; 358/147, 142; H04N 7/00, 11/00

(56) References Cited

U.S. PATENT DOCUMENTS

| | | | | |
|---|---|---|---|---|
| 4,306,250 A | * | 12/1981 | Summers et al. ........... | 348/468 |
| 4,517,598 A | * | 5/1985 | Van Valkenburg et al. . | 348/478 |
| 4,633,297 A | * | 12/1986 | Skerlos et al. .............. | 348/589 |
| 4,999,706 A | * | 3/1991 | Kinghorn .................... | 348/468 |
| 5,038,212 A | * | 8/1991 | Van Den Hombergh et al. | 348/468 |
| 5,233,423 A | * | 8/1993 | Jernigan et al. ............ | 348/564 |
| 5,341,291 A | * | 8/1994 | Roizen et al. ......... | 364/413.02 |
| 5,386,238 A | * | 1/1995 | Kinghorn et al. ........... | 348/468 |
| 5,410,359 A | * | 4/1995 | Odijk et al. ................. | 348/468 |
| 5,440,632 A | | 8/1995 | Bacon et al. ................. | 380/20 |
| 5,529,316 A | * | 6/1996 | Lee ............................. | 348/725 |
| 5,610,665 A | * | 3/1997 | Berman ....................... | 348/564 |
| 5,621,456 A | * | 4/1997 | Florin et al. ................. | 348/7 |
| 5,703,655 A | * | 12/1997 | Corey et al. ................ | 348/468 |
| 5,880,789 A | * | 3/1999 | Inaba .......................... | 348/564 |

FOREIGN PATENT DOCUMENTS

EP  0487266 A1  5/1992

OTHER PUBLICATIONS

Philips Semiconductors. Product news [online]. Royal Philips Electronics, 1999 [retrieved on Jul. 7, 1999]. Retrieved from the Internet: <URL: www–us.semiconductors.philips.com/i2c/facts/ Jan. 6, 1999.*

"One Page Economy Teletext/TV Microcontroller" Philips Semiconductors, Preliminary Specification, Feb. 1995, SAA5290.

* cited by examiner

*Primary Examiner*—Michael Lee
*Assistant Examiner*—Linus H. Lo
(74) *Attorney, Agent, or Firm*—Laurie E. Gathman

(57) ABSTRACT

For a possible flexible adaptation to changing ambient conditions, a circuit arrangement comprising an integrated circuit in which a microprocessor is provided which controls an index generator provided in the integrated circuit for teletext and/or on-screen display functions and which performs control functions of a television apparatus by means of a control interface provided in the integrated circuit is characterized in that a storage interface for a read-only memory outside the integrated circuit is provided in the integrated circuit, and in that the read-only memory comprises at least a part of the program code for the microprocessor and at least a font for the teletext function and possible further index functions.

16 Claims, 1 Drawing Sheet

CIRCUIT ARRANGEMENT FOR INDEX AND CONTROL FUNCTIONS OF A TELEVISION APPARATUS

BACKGROUND OF THE INVENTION

1. Field of the Invention

The invention relates to a circuit arrangement comprising an integrated circuit in which a microprocessor is provided which controls an index generator provided in the integrated circuit for teletext and/or on-screen display functions and which performs control functions of a television apparatus by means of a control interface provided in the integrated circuit.

2. Description of the Related Art

Such an integrated circuit is marketed by Philips under the type name SAA 5290. This circuit includes a microprocessor which is capable of taking over control functions for the television apparatus in which the integrated circuit may be incorporated. Moreover, a decoder for teletext functions is provided in the integrated circuit. This decoder is implemented as hardware. The circuit is capable of taking over so-called on-screen display (OSD) functions such as, for example the display of the adjusted sound volume. The software required in the IC, particularly for the microprocessor, is contained as a ROM in the IC. This software cannot be adapted to changing ambient conditions. A given type of such an integrated circuit is thus not suitable for different apparatuses or for different purposes.

SUMMARY OF THE INVENTION

It is an object of the invention to improve the circuit arrangement described in the opening paragraph in such a way that a more universal use and a simpler adaptation to other conditions is possible.

According to the invention, this object is solved in that a storage interface for a read-only memory outside the integrated circuit is provided in the integrated circuit, and in that the read-only memory comprises at least a part of the program code for the microprocessor and at least a font for the teletext function and possible further index functions.

In the circuit according to the invention, a read-only memory (ROM) is provided outside the circuit, which memory comprises at least a part of the program code for the microprocessor and the fonts or characters required for the teletext functions or on-screen display functions, respectively. Moreover, a ROM may be provided in the integrated circuit which is suitable, for example for those parts of the program code which are independent of the circumstances in which they are used.

The external read-only memory has the advantage that it can easily be exchanged and thus a simple adaptation to different apparatuses or ambient conditions can take place. The integrated circuit as such may thus always be implemented in an identical manner, which reduces its cost. An adaptation to different environments, for example different types of television apparatuses for which the circuit arrangement is provided, then only leads to an adaptation of the code in the read-only memory. Thus, an updating of changed ambient conditions is also easily possible in this way.

The number of external components is limited in that only one read-only memory is provided for the program code for the microprocessor, or at least parts of the program code, and for the fonts and characters for the teletext functions and/or on-screen display functions.

In accordance with an embodiment of the invention, operating system software is provided for the microprocessor, which software is at least partly stored in the external read-only memory and has a software interface on which the application programs can be set up, which are stored exclusively in the external read-only memory.

To provide universal use of the microprocessor and hence the entire integrated circuit, an operating system software is provided for the microprocessor which can be directly set up on hardware of the microprocessor. This operating system software as such still does not provide the required functions for the on-screen display, teletext functions or control of the television apparatus. The operating system software serves as a basis for application software set up on this software, which application software then realizes the required functions. The hardware-oriented operating system software may be partly provided in the integrated circuit and partly in the external read-only memory. It is advantageous to provide those parts of the operating system software, which are time-critical, within the integrated circuit and to store the less time-critical, i.e. slower parts of the operating system software in the external read-only memory. In any case, the application software to be set up on this operating system software is provided for application programs in the external read-only memory. The advantage of a quick adaptation to changed or different circumstances of use is then maintained, because in these cases only the application programs or the application software as such, which are stored in the external read-only memory, are to be changed. The hardware-oriented operating system software remains unchanged, so that it is unimportant whether a part of this software is stored in the read-only memory provided in the integrated circuit.

In accordance with a further embodiment of the invention, the integrated circuit is provided with a data reception unit via which teletext data and possible further data are received from an external signal source, particularly a receiving unit of a television apparatus, said data being identified and A/D converted in the data reception unit, and in that the digital data supplied by the reception unit of the integrated circuit are decoded in a software-controlled manner by means of the microprocessor and further processed.

To process teletext data, the picture lines of a television signal are applied to the data reception unit in the integrated circuit from a reception unit of a television apparatus. The data reception unit determines the lines which comprise teletext data or other data. An A/D conversion of the picture lines comprising these data takes place in the data reception unit. The data are then made available within the integrated circuit. The teletext data are decoded in a software-controlled manner, i.e. a hardware decoder is not provided but the decoding takes place by means of the microprocessor and a corresponding program.

In accordance with a further embodiment of the invention, the index generator is implemented for building up arbitrary graphics, whose output data are applied to the integrated circuit from the exterior, particularly from the external read-only memory, and which are further processed in the integrated circuit.

The data for the build-up of such graphics are preferably stored in the external read-only memory. They are read from this memory and further processed in the integrated circuit under the control of the microprocessor. Thus, there is also the advantage that such graphics can be easily changed, namely by a different programming of the external read-only memory.

In a further embodiment of the invention, arbitrary pixel graphics are generated in a software-controlled manner by means of the microprocessor from output data stored in the external read-only memory, which pixel graphics have a preselectable pixel and color resolution and, possibly after temporary storage, are given a format which is suitable for indication by means of the indication unit.

Graphics stored in the external read-only memory may be further processed in the integrated circuit. This provides a versatility of indication possibilities which can relatively easily be realized due to the structure of the integrated circuit. Controlled by the microprocessor or a software program, the pixel graphics stored externally in their original form are further processed within the integrated circuit so that new graphics are produced. Due to its structure, the circuit arrangement is capable of generating or further processing high-resolution pixel graphics. Advantageously, the externally stored graphics may be accompanied by information about the pixel and color resolution. The further processed high-resolution graphics may be temporarily stored within the integrated circuit and, by means of the indication unit, they may subsequently be given a format which can be further processed and indicated by the television apparatus. The circuit arrangement according to the invention thus provides the possibility of displaying high-resolution graphics in any arbitrary form on a television apparatus. This may be done, for example for on-screen display purposes, but it is also possible to generate effects, improved graphics for teletext functions, or the like in this way.

In a further embodiment of the invention, a storage unit may advantageously be incorporated in the integrated circuit for temporarily storing high-resolution graphics. This storage unit may also be used for storing a graphic cursor. Such a graphic cursor has no fixed predetermined shape but may have different shapes which are stored in the storage unit. The shape of the cursor may thereby be adapted for the relevant indication situation.

In a further embodiment, a data decoder for special functions such as, for example, Hamming decoding, CRC error correction or decrypting encrypted programs is provided in the integrated circuit. Due to the integration of such a data decoder, a corresponding external circuit is not required. The internal data decoder may be used for different purposes and is thus universally applicable.

In a further advantageous embodiment of the invention, the decoder may continuously subject data supplied thereto to the decoding process. The output data of the decoder are only requested when encoded data are concerned. This has the advantage that data can immediately be made available in a decoded form by the decoding unit as soon as data in a decoded form are recognized. If the decoding process did not proceed continuously, it would be necessary to supply coded data to the decoder once more when these coded data are recognized so that this decoder can perform the decoding operation. This resupply of data will be superfluous because the decoding process proceeds continuously and thus decoded data can be called for any time.

In accordance with a further embodiment of the invention, the integrated circuit is provided with a synchronizing unit which generates clock signals of different frequencies required in the integrated circuit from an externally supplied clock signal. The externally supplied clock signal may be supplied, for example, by a quartz oscillator. The synchronizing unit generates various clock signals of different frequency within the circuit from this externally supplied clock signal.

In accordance with a further embodiment of the invention, the synchronizing unit varies the frequency of the clock signals generated for the index generator, dependent on the index parameters of a selected graphic standard. The above-mentioned high-resolution graphics may have different index formats, for example, graphics having an aspect ratio of 16:9 or 4:3, but the graphic resolution may also vary and, dependent on the parameters of this indication, different clock frequencies will be required. The synchronizing unit applies clock signals with a frequency adapted to the parameters of the index format to the index generator.

These and other aspects of the invention are apparent from and will be elucidated with reference to the embodiments described hereinafter.

BRIEF DESCRIPTION OF THE DRAWINGS

In the drawing:

The sole FIGURE is a block diagram of a circuit arrangement according to the invention.

DESCRIPTION OF THE PREFERRED EMBODIMENTS

Figure 1:
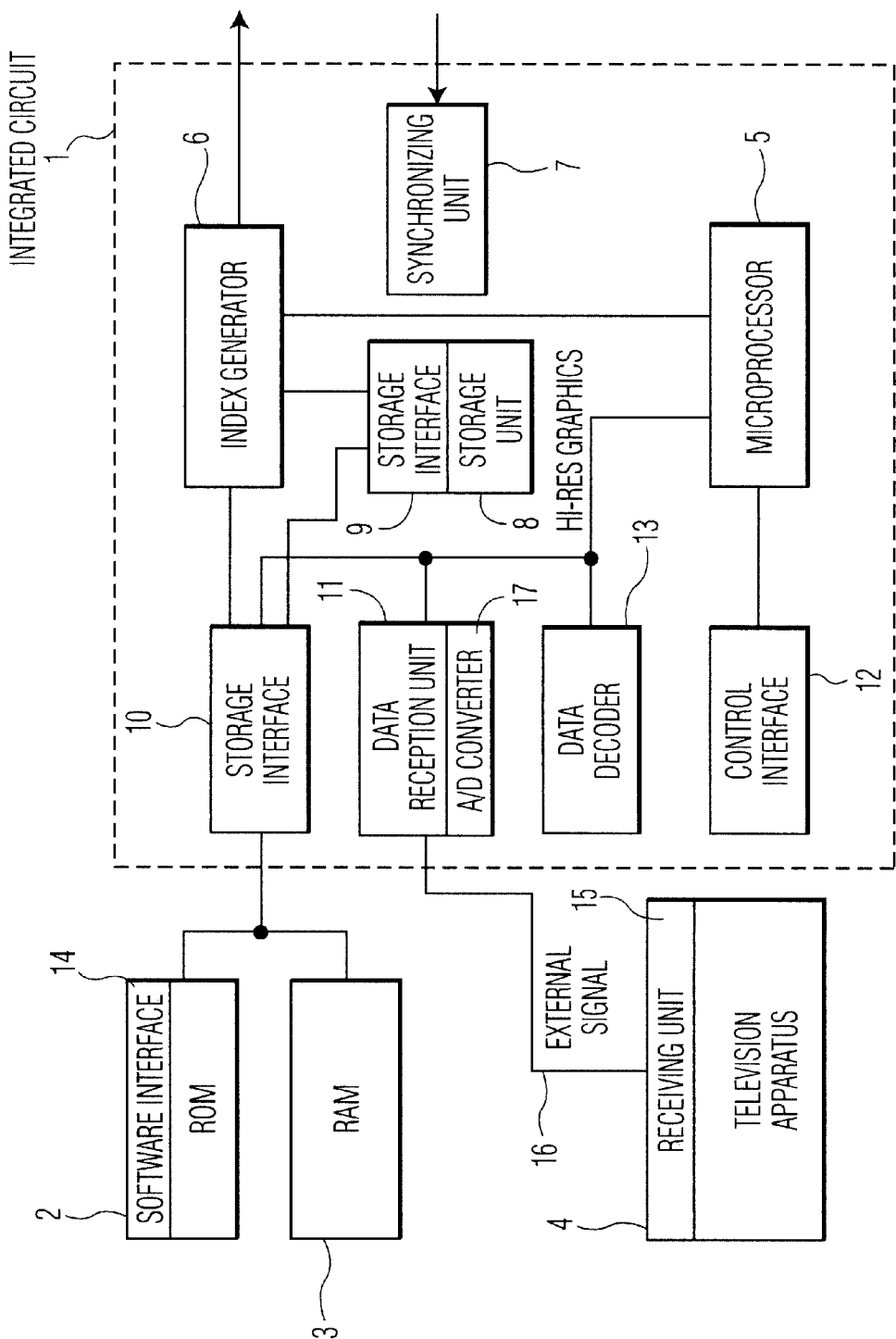

The FIGURE shows diagrammatically an integrated circuit 1 comprising a plurality of circuit elements, as well as external circuit elements.

A read-only memory 2 (ROM) is provided externally of this integrated circuit 1. Moreover, a random-access memory 3 (RAM) is provided. Shown externally of the integrated circuit 1 is a circuit block 4 which may comprise, for example circuit elements of a television apparatus not shown and in which the integrated circuit 1 and the memories 2 and 3 are arranged.

The integrated circuit 1 incorporates a microprocessor 5 which controls all of the circuit elements provided in the integrated circuit 1.

The integrated circuit 1 further includes an index generator 6 which supplies a signal from its output, which signal may be displayed on a display screen of the television apparatus 4.

The integrated circuit further includes a synchronizing unit 7 which supplies different clock signals for the circuits within the integrated circuit 1. The synchronizing unit 7 receives externally a clock signal of a fixed frequency, for example, from a quartz oscillator.

Moreover a storage unit 8 having a storage interface 9 is included in the integrated circuit 1.

A further storage interface 10 is provided, which ensures a connection with the externally provided read-only memory 2 and the externally provided random-access memory 3 for the circuit elements provided in the integrated circuit 1.

A data reception unit 11 provided in the integrated circuit 1 is coupled to circuit elements of the television apparatus 4. This also applies to a control interface 12 of the integrated circuit 1.

The integrated circuit 1 is further provided with a data decoder 13.

The function of the circuit blocks of the circuit arrangement shown in FIG. 1 will be described hereinafter.

Within the integrated circuit 1, and also for the function of the overall circuit arrangement of FIG. 1, the microprocessor 5 takes over an essential function because it quasi-controls all elements shown. For the purpose of control, the microprocessor 5 requires a software program which is at least partly stored in the external read-only memory 2.

This software program is advantageously divided into at least two planes. There is a so-called operating system software which is directly set up on the hardware of the microprocessor and as such does not provide the possibility of complete functions. This relatively hardware-oriented operating system software is at least partly stored in the external read-only memory 2. A part of this software may also be stored in a memory (not shown) provided in the integrated circuit 1. The advantages of the circuit arrangement according to the invention, which particularly exist in a flexible adaptation, are not negatively influenced by a possible partial storage of this operating system software in the integrated circuit, because this operating system software is independent of the adaptation to different applications. It is hardware-oriented and thus independent of changes of the desired functions.

In any case, the application software set up on this operating system software and providing the actual functions is completely stored in the external read-only memory 2. An adaptation of this software to changed conditions can easily be realized by exchanging the memory 2.

The connection with the external read-only memory 2 and the random-access memory 3 is realized by the storage interface 10. Data are read or written via this interface from the external memories.

The microprocessor may configure storage areas in the external memories, particularly in the random-access memory 3, as required. The same applies to the storage unit 8 provided in the integrated circuit.

Fonts required for teletext or on-screen display functions are stored in the external read-only memory 2. These data can be read via the storage interface 10 and further processed in the integrated circuit 1 under the control of the microprocessor 5.

The storage interface 10 for the external memories and the interface 9 of the storage unit 8 in the integrated circuit are directly connected via a DMA data exchange. In this way, a direct exchange of data can take place between the storage units, which exchange is only triggered by the microprocessor 5 but does not need to be controlled thereby in detail.

The external read-only memory 2 may not only comprise a universal font, but also individual fonts, dependent on their users. These fonts may be read from the read-only memory 2 at any time. This precludes the requirement that such individual fonts must be stored, or temporarily stored, in a RAM which in other cases is required in the integrated circuit.

Both the microprocessor 5 and the index generator 6 may access the storage unit in the integrated circuit 1 and the two external memories 2 and 3. This is effected in a time-sharing process.

The data reception unit 11 comprises all picture lines of a television signal which is received from, for example, the television apparatus 4. These data or picture lines are A/D-converted within the data reception unit 11, while the unit synchronizes with the converted data, and the type of data is determined within the data reception unit 11. The data are marked correspondingly and stored in the internal storage unit 8.

The external television apparatus 4 supplies all picture lines to the data reception unit 11. The relevant lines are filtered out by the data reception unit 11.

These are not only teletext or video text data. Currently, also an identification about the format, or the aspect ratio of the picture, is transmitted in the television signal. This information may be gained by means of the data reception unit and made available in a correspondingly marked manner.

The data decoder 13 in the integrated circuit 1 is used for decoding possibly encoded data. These decoding operations may include, for example a Hamming decoding, a CRC error correction or decrypting encrypted television programs. The data decoder 13 always operates in synchronism, i.e. the data are always applied to it, independent of the fact whether these data are coded or uncoded. This has the advantage that upon recognition of coded data, these data need not be applied to the data decoder 13 again for the purpose of decoding. This would otherwise be required because a part of the data has already been transmitted at the instants when coded data are recognized. These data should then be applied to the decoder again. Due to the continuous synchronism of the decoder, this repeated reading of data is superfluous and the decoded data are immediately available.

The control interface 12 further provided in the integrated circuit 1 is a configurable interface which may be given different functions by the microprocessor 5. For example, so-called SADC functions may be realized in the control interface 12. In this case, software-controlled A/D conversion is concerned. In this process, the analog input signal is compared with a D/A-converted analog signal. This comparison yields the result whether the externally applied signal is larger or smaller than the comparison signal. Subsequently, this comparison signal is changed until it is substantially equal to the externally supplied analog signal. The actual value of the analog signal is then determined. Such SADC functions may be used, for example, for scanning resistance matrices by means of the control interface 12. Such a matrix consists of a network of resistors which are connected point by point, for example triggered by keys on the television apparatus 4, to a reference potential. The resistance matrix then supplies from its output an analog signal which varies dependent on the keys which have been activated. This signal may be evaluated by means of such an SADC.

Moreover, pulse width modulators may be realized in the control interface 12, which supplies signals having pulses of a varying width. Diversified control functions can be performed on the television apparatus 4 by means of the signals. For example, these control functions may include audio functions such as volume, tone control or the like. However, also further control processes such as, for example, for the tuner may be performed.

Furthermore, externally supplied interrupts may be evaluated by the control interface 12. Such interrupts may be triggered, for example, when control processes are to be marked. They may include, for example key activations but also other processes proceeding in the television apparatus 4. Generally, such interrupts are used for recognizing nonsynchronous events.

The control interface 12 further includes so-called timer inputs which are used for measuring frequencies and pulse widths. Moreover, so-called UARTs may be provided which allow asynchronous serial data transmission to the television apparatus 4 as well as from this apparatus to the integrated circuit 1.

The index generator provided in the integrated circuit 1 may be used for a variety of purposes. It may be provided, for example, for displaying teletext (video text) but it is also suitable for on-screen displays in which, for example, parameters such as volume, tone control or the like are indicated on the display screen. Moreover, the index generator 6 is suitable for generating or displaying high-resolution graphics.

As is usual in teletext functions, the index generator 6 can operate in a fixed matrix with a line and column orientation.

Given signs are then to be used for different matrix positions. The required data are supplied by the data reception unit 11. The signs as such are stored in the external read-only memory 2 or the random-access memory 3 and are read from these memories via the storage interface 10.

Moreover, the index generator 6 is implemented to generate high-resolution graphics. These may be, for example, graphics comprising a block of 12×10 pixels each having two, four or 16 chrominance values. These graphic formats may, however, also be changed, or different graphic formats such as, for example, 6×10×4 per block may be provided for different indication purposes. In this case, the index generator is to receive adapted clock signals of different frequencies from the synchronizing unit 7. The corresponding control is taken over by the microprocessor 5.

In this way, quasi-arbitrary graphics may be generated. The data of basic graphics are stored in the external read-only memory 2 and read from this memory. These data may then be displayed. It is also possible to further process, i.e. change these data by means of the microprocessor 5. The resultant data of the intermediate steps may be stored in the external random-access memory 3 or in the internal storage unit 8. This may be done in such a way that, for example, the line-column information is stored in the internal storage unit and the information about the single pixels is stored in the external memory. Apart from these pixel data, additional mode information may be stored in the external memory, which information indicates how the stored pixel data are to be interpreted. These mode data indicate the format of the data, thus, for example, the number of picture data for a pixel block in the horizontal or vertical direction and the amount of color information for each pixel of this block.

It will be evident that very large data quantities are obtained for such high-resolution graphics, particularly when they are changed. In circuit arrangements of the prior art, all of these intermediate steps had to be stored in the external read-only memory 2. In the circuit arrangement according to the invention, a large quantity of memory sites is saved in that only the output data are stored.

If, as explained above, such high-resolution graphics have been generated and their data have temporarily been stored in the external random-access memory 3 and the internal storage unit 8, the line-column information is first read from the internal storage unit 8 for displaying such graphics. The pixel data which are required from the external memory 2 or 3 are then known. These data are read. It is known from the mode information which data are essential for color display. The corresponding bits are used by the index generator 6 for selecting the colors from a range of colors.

The index generator 6 shown in FIG. 1 includes a D/A converter (not shown) by means of which the digital picture data are initially converted into analog signals, which may be displayed, for example on a display screen of the television apparatus 4. The pixel data may be provided with a so-called fading value. A mixing ratio can be fixed with these values, with which the graphics and a video image are to be displayed.

A so-called graphic cursor may be stored in the storage unit 8 or in a further storage unit to be provided. Such a graphic cursor may have different shapes which, dependent on their use, may be selected individually. These cursor data may be requested by the index generator 6 from the memory and may also be displayed.

The microprocessor 5 may configure the index generator 6. With a view to the index format (aspect ratio), such a configuration may consist of, for example, the number of lines or columns, two-sided display for teletext, and the like.

In summary, it can be concluded that the microprocessor in the integrated circuit 1 performs all control assignments within the integrated circuit 1. Moreover, it is used for controlling arbitrary functions in the television apparatus 4 and has access to external memories 2 and 3 via the storage interface 10. All of the programs required for controlling the functions proceed in the microprocessor 5.

On the one hand, this results in an economy of a further external microprocessor. On the other hand, the circuit arrangement according to the invention has the advantage that the external read-only memory 2 can easily be adapted to different conditions of use. The software programs in this memory, particularly the application-oriented software programs, can be changed any time, or the read-only memory 2 may be replaced by another memory. Modifications of these programs, or of the fonts also stored in the read-only memory 2, do not require any modifications of the integrated circuit 1. A very flexible adaptation to different ambient conditions is thus ensured.

We claim:

1. A television display circuit arrangement comprising an integrated circuit and a read only memory, said integrated circuit comprising:
    a microprocessor for controlling functions of the integrated circuit including the display of on-screen fonts;
    a single storage interface for said read-only memory; and
    a storage unit for temporary storage of hi-resolution graphics and/or a graphic cursor, wherein there is a direct exchange of data between the storage unit and the storage interface for the read-only memory;
    the read only memory located external to the integrated circuit for storing at least a part of the program code for the microprocessor and at least a font to be displayed on-screen, as well as data from which arbitrary pixel graphics having a preselectable pixel and color resolution can be generated in a software-controlled manner and given a format which is suitable for display.

2. A circuit arrangement as claimed in claim 1, wherein operating system software is provided for the microprocessor, which software is at least partly stored in the external read-only memory and has a software interface on which application programs can be set up, which are stored exclusively in the external read-only memory.

3. A circuit arrangement as claimed in claim 1 wherein the integrated circuit is provided with a data reception unit via which teletext data, videotext data and/or format and display data are received from a receiving unit of the television apparatus, said received data being identified and A/D converted in the data reception unit, and in that the digital data supplied by the A/D converter of the reception unit of the integrated circuit are decoded in a software-controlled manner by means of the microprocessor and further processed in accordance with their identified type.

4. A circuit arrangement as claimed in claim 1, further including an index generator wherein the index generator is implemented for building up arbitrary graphics, whose output data are applied to the integrated circuit from the read-only memory.

5. A circuit arrangement as claimed in claim 1, wherein a data decoder for special functions comprising at least one of decoding, error correction, and decrypting encrypted programs is provided in the integrated circuit.

6. A circuit arrangement as claimed in claim 1, wherein a data decoder continuously subjects data supplied thereto to the decoding process, and in that the output data of the decoder are only requested when encoded data are concerned.

7. A circuit arrangement as claimed in claim 1, wherein the integrated circuit is provided with a synchronizing unit which generates clock signals of different frequencies required in the integrated circuit from an externally supplied clock signal.

8. A circuit arrangement as claimed in claim 1, wherein a synchronizing unit varies the frequency of clock signals generated for an index generator, dependent on index parameters corresponding to a selected graphic.

9. A circuit arrangement as claimed in claim 2, wherein the integrated circuit is provided with a data reception unit via which at least one of teletext data, videotext data, and format and display data are received from a receiving unit of a television apparatus, said received data being identified and A/D converted in the data reception unit, and in that the digital data supplied by the A/D converter of the reception unit of the integrated circuit are decoded in a software-controlled manner by means of the microprocessor and further processed in accordance with their identified type.

10. A circuit arrangement as claimed in claim 2, further including an index generator wherein the index generator is implemented for building up arbitrary graphics, whose output data are applied to the integrated circuit from the read-only memory.

11. A circuit arrangement as claimed in claim 3, further including an index generator wherein the index generator is implemented for building up arbitrary graphics, whose output data are applied to the integrated circuit from the external read-only memory.

12. A circuit arrangement as claimed in claim 4, wherein arbitrary pixel graphics are generated in a software-controlled manner by means of the microprocessor from output data stored in the external read-only memory, which pixel graphics have a preselectable pixel and color resolution and, after temporary storage, are given a format which is suitable for indication by means of the index generator.

13. A circuit arrangement as claimed in claim 12, wherein a data decoder for special functions comprising at least one of decoding, error correction, and decrypting encrypted programs is provided in the integrated circuit.

14. A circuit amendment as claimed in claim 10 wherein a data decoder continuously subjects data supplied thereto to the decoding process, and in that output data of the decoder are only requested when encoded data are concerned.

15. A circuit arrangement as claimed in claim 13, wherein the integrated circuit is provided with a synchronizing unit which generates clock signals of different frequencies required in the integrated circuit from an externally supplied clock signal.

16. A circuit arrangement as claimed in claim 7, wherein the synchronizing unit varies the frequency of the clock signals generated for an index generator dependent on index parameters corresponding to a selected graphic.

* * * * *